United States Patent
Susanna et al.

(10) Patent No.: US 12,350,977 B2
(45) Date of Patent: Jul. 8, 2025

(54) SOUNDPROOF TYRE FOR VEHICLE WHEELS

(71) Applicant: Pirelli Tyre S.p.A., Milan (IT)

(72) Inventors: Antonio Susanna, Milan (IT); Raffaella Donetti, Milan (IT); Antonio Monterosso, Milan (IT); Thomas Hanel, Milan (IT)

( * ) Notice: Subject to any disclaimer, the term of this patent is extended or adjusted under 35 U.S.C. 154(b) by 73 days.

(21) Appl. No.: 18/558,809

(22) PCT Filed: May 12, 2022

(86) PCT No.: PCT/IB2022/054423
§ 371 (c)(1),
(2) Date: Nov. 3, 2023

(87) PCT Pub. No.: WO2022/238951
PCT Pub. Date: Nov. 17, 2022

(65) Prior Publication Data
US 2024/0239141 A1    Jul. 18, 2024

(30) Foreign Application Priority Data
May 13, 2021    (IT) .................. 102021000012329

(51) Int. Cl.
B60C 19/00     (2006.01)
B60C 1/00      (2006.01)
C08J 9/00      (2006.01)
C08J 9/10      (2006.01)

(52) U.S. Cl.
CPC ............ *B60C 19/002* (2013.01); *B60C 1/00* (2013.01); *C08J 9/0028* (2013.01); *C08J 9/0061* (2013.01); *C08J 9/0066* (2013.01); *C08J 9/103* (2013.01); *C08J 2201/026* (2013.01);
(Continued)

(58) Field of Classification Search
CPC ..................................... B60C 19/002
See application file for complete search history.

(56) References Cited

U.S. PATENT DOCUMENTS 6,831,109 B1    12/2004  Beirakh et al.
2008/0264539 A1  10/2008  Merino-Lopez et al.
(Continued)

FOREIGN PATENT DOCUMENTS

JP    2015522698 A  *  8/2015
WO    2015014576 A1    2/2015
(Continued)

OTHER PUBLICATIONS

Machine translation: JP-2015522698-A, N/A, (Year: 2025).*
(Continued)

*Primary Examiner* — Kendra Ly
(74) *Attorney, Agent, or Firm* — Finnegan, Henderson, Farabow, Garrett & Dunner, L.L.P.

(57) ABSTRACT

The present invention relates to a soundproof tyre for vehicle wheels comprising a noise reducing element made by vulcanising a vulcanisable and expandable elastomeric compound comprising at least one elastomeric polymer, at least one expanding agent, and at least one compound selected from the group of (i) fatty acid amides and (ii) polymers and copolymers of caprolactone, lactic acid, glycolic acid, and mixtures thereof.

18 Claims, 8 Drawing Sheets

(52) U.S. Cl.
CPC ........ *C08J 2307/00* (2013.01); *C08J 2409/00* (2013.01); *C08J 2467/00* (2013.01)

(56) References Cited

U.S. PATENT DOCUMENTS

| | | |
|---|---|---|
| 2012/0247637 A1* | 10/2012 | Tanaka ..................... B60C 1/00 152/450 |
| 2012/0252915 A1 | 10/2012 | Maesaka et al. |
| 2013/0087267 A1 | 4/2013 | Sandstrom et al. |
| 2019/0092103 A1* | 3/2019 | Giannini ............... B60C 19/002 |

FOREIGN PATENT DOCUMENTS

| | | |
|---|---|---|
| WO | 2015149959 A1 | 10/2015 |
| WO | 2016051371 A1 | 4/2016 |
| WO | 2017163219 A1 | 9/2017 |

OTHER PUBLICATIONS

International Search Report form the European Patent Office in corresponding International Application No. PCT/IB2022/054423 mailed Aug. 25, 2022.

Written Opinion of the International Searching Authority from the European Patent Office in corresponding International Application No. PCT/IB2022/054423 mailed Aug. 25, 2022.

* cited by examiner

SOUNDPROOF TYRE FOR VEHICLE WHEELS

This application is a national stage entry application under 35 U.S.C. § 371 of International Application No. PCT/IB2022/054423, filed on May 12, 2022, and claims priority to Italian Application No. 102021000012329, filed May 13, 2021; the contents of each application is incorporated herein by reference in its entirety.

FIELD OF THE INVENTION

The present invention relates to a soundproof tyre for vehicle wheels. More specifically, the invention relates to a soundproofed tyre comprising a noise reducing element, i.e. capable of reducing the noise perceived in the passenger compartment of vehicles, due to the attenuation of the cavity noise of the tyre itself.

PRIOR ART

In the automotive industry there is a growing demand to improve driver and passenger comfort, particularly to reduce the noise of vehicles, especially high-end vehicles.

The automotive industry tends to produce ever lighter vehicles, and/or provided with ever more silent engines—such as electric motors—in which, by contrast, road noises are perceived with more annoyance.

The problem of reducing the cavity noise is therefore increasingly felt for both high range vehicles, in which comfort and, specifically soundproofing, are important requirements, and for sports cars, for which in fact a lowered distribution and particularly stiff damping and transmission systems are typical, which substantially do not attenuate the noise, which is transmitted virtually unchanged from the tyres to the compartment.

In order to reduce this type of noise it is known to introduce sound-absorbing materials in the inner cavity of the tyres, either in free form or by fixing strips thereof on the inner surface of the liner. The sound-absorbing material is capable of breaking down the sound wave, converting the energy of the incident sound into heat. The sound-absorbing material typically consists of foams of heat-resistant expanded polymers, such as, for example, foams of polyurethanes or elastomeric polymers (natural rubber, butyl rubber, etc.).

A soundproof tyre for vehicle wheels typically comprises a noise reducing element in the inner cavity, preferably fixed in the form of stripes on the inner surface of the liner.

The noise reducing element is able in particular to mitigate the so-called cavity noise. Said cavity noise is generated during the rolling of the tyre on the road, when the air present in the inner annular cavity is placed in vibration, as it is cyclically compressed in the tread crushing step, thus generating sound waves that are amplified by resonance. Cavity noise then propagates to the passenger compartment of the vehicle, by transmission through the rim, the hub, the suspension and the frame, and is perceived as very annoying by passengers.

The frequencies at which the air resonates in the cavity are inversely proportional to the tyre circumference, and depend, among other things, also on the shape of the cavity itself, on the nature and shape of the materials that internally line it. Indicatively, the resonance frequency can range from about 50 to 400 Hz, typically around 180-220 Hz for car tyres, with a diameter of about 600 to 800 mm and 130-150 Hz for tyres of heavy vehicles, with a diameter of about 750 to 1200 mm. Soundproof tyres are known in the art, and are described in numerous patent application publications, such as for example WO/2017/163219A1, WO/2016/051371A1, WO2015/149959A1, US2008/0264539A1 and US2013/0087267A1.

In particular, US2012/0247637 describes a soundproof tyre comprising a noise reducing element consisting of a rubber layer placed on the inner surface of the tyre, where such rubber layer is made with a vulcanisable composition comprising an elastomeric polymer, for example natural rubber or butyl rubber, a reinforcing agent, for example silica or carbon black, an expanding agent, for example azodicarbonamide, and a hot-melt compound with a melting point of between 70° C. and 150° C., for example urea, the latter component being necessary to reduce expansion and control the uniformity of the layer thickness during vulcanisation, and to significantly increase the soundproofing capacity of the resulting vulcanised layer.

SUMMARY OF THE INVENTION

While the solutions described in the art, and in particular in US2012/0247637, give interesting results, the Applicant has noted that the use of urea in elastomeric materials for the manufacture of tyres involves a series of contraindications.

First, in general terms, urea has a pKb dissociation constant of 0.1 at 21° C. (Perrin, D. D. (1965) Dissociation constants of Organic Bases in Aqueous Solutions. Butterworth, London), and consequently it is a chemical compound that irritates the skin and eyes which makes it difficult to handle in the industrial sector.

Furthermore, as also described in U.S. Pat. No. 6,831,109B1, mixtures of urea and/or derivatives thereof in combination with organic dicarboxylic acids, such as oxalic acid, lead to a de-vulcanisation of the sulphur lattice S—S, creating an instability of the material.

Finally, due to its chemical structure, polarity and molecular size, urea shows migration phenomena in the tyre compounds, affecting the vulcanisation kinetics of the compounds during the vulcanisation process and/or leading to unsightly "surfacing" phenomena on the tyre surface.

The Applicant has therefore undertaken studies for manufacturing soundproof tyres for vehicle wheels comprising a noise reducing element of foamed rubber made by vulcanising an elastomeric composition which may be vulcanised in the presence of an expanding agent without the aid of urea.

The Applicant, after extensive experimentation, surprisingly found that the use of a combination of fatty acid amides and polycaprolactones was able to perform the same function as urea, overcoming the contraindications deriving from such compound, and obtaining similar or improved results in terms of cavity noise reduction.

Therefore, a first aspect of the present invention is a soundproof tyre for vehicle wheels comprising:
- a carcass structure;
- a tread band in a radially outer position with respect to said carcass structure;
- a vulcanised layer of airtight elastomeric compound (liner), disposed in a radially inner position with respect to the carcass structure;
- a noise reducing element made of foamed elastomeric material disposed in a radially inner position with respect to the vulcanised layer of airtight elastomeric compound and axially extending at least at a part of the tread band;

wherein said noise reducing element is made by vulcanising a vulcanisable and foamable elastomeric compound obtained by mixing an elastomeric composition, wherein said elastomeric composition comprises:
- (i) 100 phr of at least one natural or synthetic elastomeric polymer,
- (ii) from 10 to 80 phr of at least one reinforcing filler,
- (iii) less than 3 phr of at least one vulcanising agent,
- (iv) from 5 to 30 phr of at least one expanding agent,
- (v) from 5 to 40 phr of at least one compound selected from the group of fatty acid amides, and
- (vi) from 1 to 20 phr of at least one compound selected from the group of polymers and copolymers of caprolactone, lactic acid, glycolic acid, and mixtures thereof.

In a second aspect thereof, the present invention also relates to a vulcanisable and foamable elastomeric compound obtained by mixing an elastomeric composition, wherein said elastomeric composition comprises:
- (i) 100 phr of at least one natural or synthetic elastomeric polymer,
- (ii) from 10 to 80 phr of at least one reinforcing filler,
- (iii) less than 3 phr of at least one vulcanising agent,
- (iv) from 5 to 30 phr of at least one expanding agent, and
- (v) from 5 to 40 phr of at least one compound selected from the group of fatty acid amides, and
- (vi) from 1 to 20 phr of at least one compound selected from the group of polymers and copolymers of caprolactone, lactic acid, glycolic acid, and mixtures thereof.

BRIEF DESCRIPTION OF THE DRAWINGS

The accompanying drawings are provided for indicative and, thus, non-limiting purpose only.

DEFINITIONS

Figure 1:
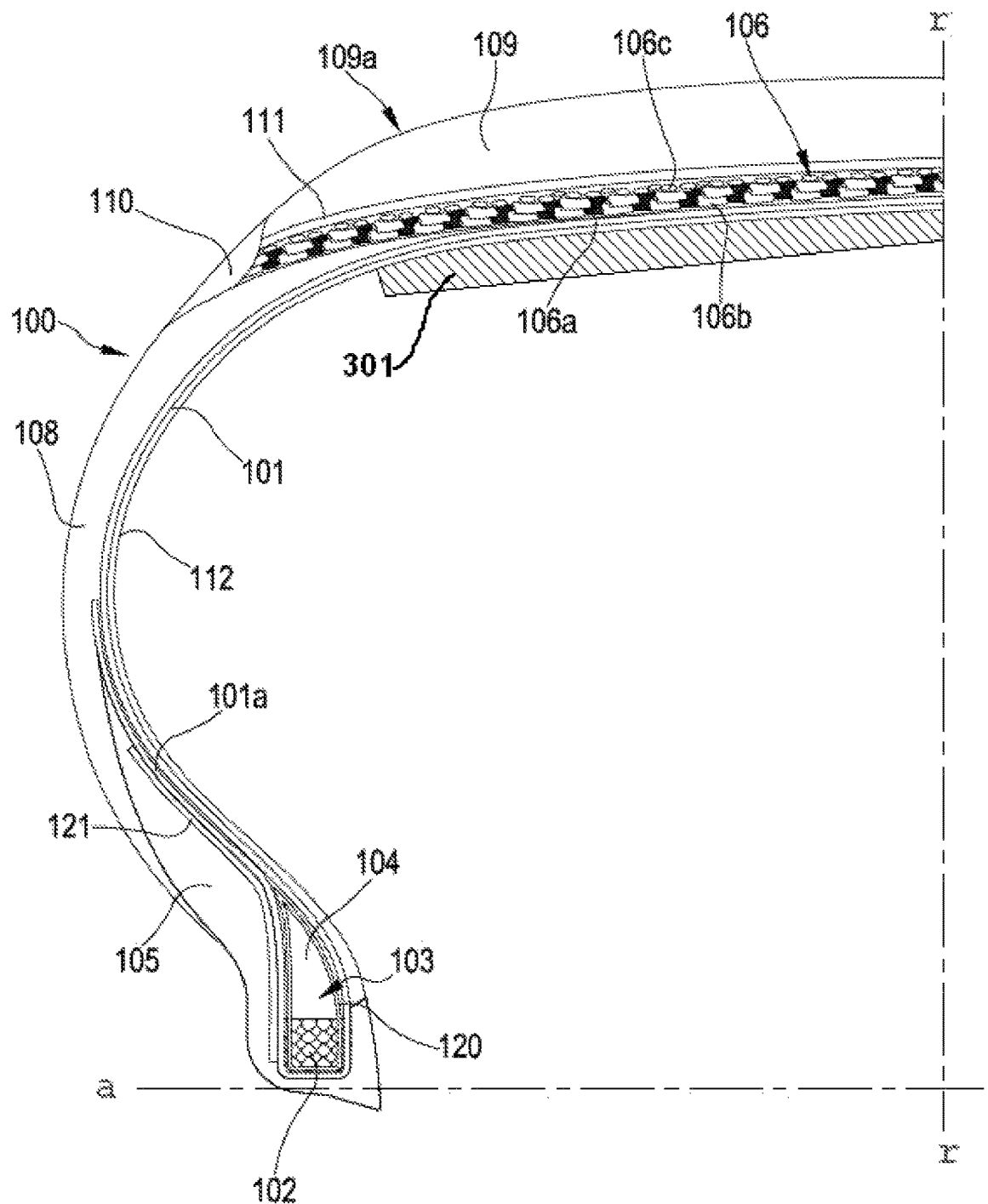
FIG. 1 schematically shows a radial half-section of a soundproof tyre for vehicle wheels.

For the purposes of the present description and the following claims, the term "phr" (acronym for parts per hundreds of rubber) indicates the parts by weight of a given elastomeric compound component per 100 parts by weight of the elastomeric polymer, considered net of any extension oils.

The term "elastomeric composition" means a composition comprising at least one diene elastomeric polymer and one or more additives, which by mixing and possible heating provides an elastomeric compound suitable for use in tyres and components thereof.

The components of the elastomeric composition are not generally introduced simultaneously into the mixer but typically added in sequence. In particular, the vulcanisation additives, such as the vulcanising agent and possibly the accelerant and retardant agents, are usually added in a downstream step with respect to the incorporation and processing of all the other components.

In the final vulcanisable elastomeric compound, the individual components of the elastomeric composition may be altered or no longer individually traceable as modified, completely or in part, due to the interaction with the other components, of heat and/or mechanical processing. The term "elastomeric composition" herein is meant to include the set of all the components that are used in the preparation of the elastomeric compound, regardless of whether they are actually present simultaneously, are introduced sequentially or are then traceable in the elastomeric compound or in the final tyre.

The term "elastomeric polymer" indicates a natural or synthetic polymer which, after vulcanisation, may be stretched repeatedly at room temperature to at least twice its original length and after removal of the tensile load substantially immediately returns with force to approximately its original length (according to the definitions of the ASTM D1566-11 Standard terminology relating to Rubber).

The term "diene polymer" indicates a polymer or copolymer derived from the polymerisation of one or more different monomers, among which at least one of them is a conjugated diene (conjugated diolefin).

The term "elastomeric compound" indicates the compound obtainable by mixing and possibly heating at least one elastomeric polymer with at least one of the additives commonly used in the preparation of tyre compounds.

The term "vulcanisable and expandable elastomeric compound" indicates the elastomeric compound ready for vulcanisation and the simultaneous expansion, obtainable by incorporation into an elastomeric compound of all the additives, including the vulcanisation and expansion ones.

The term "expanded vulcanised elastomeric compound" means the material obtainable by vulcanisation of a vulcanisable and expandable elastomeric compound.

The term "green" indicates a material, a compound, a composition, a component or a tyre not yet vulcanised.

The term "vulcanisation" refers to the cross-linking reaction in a natural or synthetic rubber induced by a sulphur-based cross-linking agent.

The term "expansion" refers to the increase in volume of the vulcanisable and expandable elastomeric compound caused by the generation and trapping of gas induced by an expanding agent during vulcanisation.

The term "vulcanising agent" indicates a product capable of transforming natural or synthetic rubber into elastic and resistant material by virtue of the formation of a three-dimensional network of inter- and intra-molecular bonds. Typical vulcanising agents are sulphur-based compounds such as elemental sulphur, polymeric sulphur, sulphur-donor agents such as bis[(trialkoxysilyl)propyl]polysulphides, thiurams, dithiodimorpholines and caprolactam-disulphide.

The term "expanding agent" refers to a compound capable of generating gas by heating the vulcanisable and expandable elastomeric compound to the vulcanisation temperature.

The term "vulcanisation accelerant" means a compound capable of decreasing the duration of the vulcanisation process and/or the operating temperature, such as TBBS, sulphenamides in general, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system.

The term "vulcanisation retardant" indicates a product capable of delaying the onset of the vulcanisation reaction and/or suppressing undesired secondary reactions, for example N-(cyclohexylthio)phthalimide (CTP).

The term "vulcanisation package" is meant to indicate the vulcanisation agent and one or more vulcanisation additives selected from among vulcanisation activating agents, accelerants and retardants.

The term "reinforcing filler" is meant to refer to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres and mixtures thereof.

The term "white filler" is meant to refer to a conventional reinforcing material used in the sector selected from among conventional silica and silicates, such as sepiolite, paligorskite also known as attapulgite, montmorillonite, alloisite and the like, possibly modified by acid treatment and/or derivatised. Typically, white fillers have surface hydroxyl groups.

The term "mixing step (1)" indicates the step of the preparation process of the elastomeric compound in which one or more additives may be incorporated by mixing and possibly heating, except for the vulcanising agent which is fed in step (2). The mixing step (1) is also referred to as "non-productive step". In the preparation of a compound there may be several "non-productive" mixing steps which may be indicated with 1a, 1b, etc.

The term "mixing step (2)" indicates the next step of the preparation process of the elastomeric compound in which the vulcanising agent and, possibly, the other additives of the vulcanisation package are introduced into the elastomeric compound obtained from step (1), and mixed in the material, at controlled temperature, generally at a compound temperature lower than 120° C., so as to provide the vulcanisable elastomeric compound. The mixing step (2) is also referred to as "productive step".

Unless otherwise indicated, all the percentages are expressed as percentages by weight.

DETAILED DESCRIPTION OF THE INVENTION

The soundproof tyre according to the present invention may exhibit at least one of the following preferred features, taken individually or in combination with the others.

The vulcanisable and expandable elastomeric compound of the noise reducing element according to the present invention may comprise (i) at least one natural or synthetic diene elastomeric polymer derived from the polymerisation of one or more monomers, at least one of which is a conjugated diene, or (ii) at least one elastomeric polymer of one or more monoolefins with an olefinic comonomer or derivatives thereof.

The synthetic diene elastomeric polymer may be obtained by solution polymerisation, emulsion polymerisation or gas phase polymerisation of at least one conjugated diene, optionally mixed with at least one comonomer selected from monovinylarenes and/or polar comonomers in an amount not exceeding 60% by weight.

The conjugated dienes generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, may be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer which may be used in the present invention may be selected, for example, from among: cis-1,4-polyisoprene (natural or synthetic, preferably natural rubber), 3,4-polyisoprene, polybutadiene (in particular polybutadiene with a high content of 1,4-cis), isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

Monoolefins may be selected from: ethylene and α-olefins generally containing 3 to 12 carbon atoms, such as for example propylene, 1-butene, 1-pentene, 1-hexene, 1-octene or mixtures thereof. The following are preferred: copolymers selected from ethylene and an α-olefin, optionally with a diene; isobutene homopolymers or copolymers thereof with small amounts of a diene, which are optionally at least partially halogenated. The diene optionally present generally contains 4 to 20 carbon atoms and is preferably selected from: 1,3-butadiene, isoprene, chloroprene, neoprene, 1,4-hexadiene, 1,4-cyclohexadiene, 5-ethylidene-2-norbornene, 5-methylene-2-norbornene, vinylnorbornene or mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl (CIIR) or bromobutyl (BIIR) rubbers; or mixtures thereof.

The vulcanisable and expandable elastomeric compound of the noise reducing element according to the present invention comprises at least one reinforcing filler, preferably selected from carbon black, conventional silica, such as sand silica precipitated with strong acids, preferably amorphous, diatomaceous earth, calcium carbonate, titanium dioxide, talc, alumina, aluminosilicates, kaolin, silicate fibres and mixtures thereof.

Preferably, the reinforcing filler is selected from carbon black, conventional silica, silicate fibres, talc and mixtures thereof.

Commercial examples of reinforcing fillers suitable for use in the present elastomeric composition are the carbon black N326 and N375 from Cabot, the carbon black N326 and N375 from Birla, and Minstron HAR lamellar talc produced by Imerys Talc France.

The elastomeric composition preferably comprises from 20 to 60 phr, more preferably from 20 to 50 phr of said reinforcing filler.

The vulcanisable and expandable elastomeric compound of the noise reducing element according to the present invention may comprise at least one vulcanising agent.

The vulcanising agent is preferably selected from sulphur, or alternatively, sulphur-containing molecules (sulphur donors), in the presence of compounds containing zinc and fatty acids, or peroxides.

Preferably, the vulcanising agent is sulphur preferably selected from soluble sulphur (crystalline sulphur), insoluble sulphur (polymeric sulphur), (iii) oil-dispersed sulphur and mixtures thereof.

Alternatively, sulphur donor molecules such as, for example, caprolactam disulphide (CLD), bis[(trialkoxysilyl)propyl]polysulphides, dithiophosphates, phosphoryl polysulphide (SDT) and mixtures thereof may be used.

Commercial examples of suitable vulcanising agents are the 65% sulphur known under the trade name of Rhenogran of Lanxess, the 67% sulphur known under the trade name of Crystex OT33 of Eastman, the 95% sulphur known under the trade name of Solvay SchwefelKC, the rhombic crystalline sulphur known under the trade name of Sulphur (1% oil and 0.3% silica) of Zolfindustria.

Preferably, the vulcanising agent may be present in the elastomeric composition of the invention in an overall amount generally of from 0.1 to 2.5 phr, preferably from 0.2 to 2 phr, even more preferably from 0.3 to 1.5 phr. According to an alternative embodiment, the elastomeric composition is free of sulphur-based vulcanising agents, and may comprise only zinc-based or peroxide-based vulcanising agents.

The vulcanising agent is preferably used together with adjuvants such as vulcanisation activating agents, accelerants and/or retardants known to those skilled in the art. The set of vulcanisation activating agents, accelerants and/or retardants constitutes, together with the vulcanising agent, the so-called "vulcanisation package".

The vulcanisation activators which are particularly effective are zinc compounds, and in particular ZnO, $ZnCO_3$, zinc salts of saturated or unsaturated fatty acids containing from 8 to 18 carbon atoms, such as, for example, zinc stearate, which are preferably formed in situ in the elastomeric composition from ZnO and fatty acid, as well as BiO, PbO, $Pb_3O_4$, $PbO_2$ or mixtures thereof. Commercial examples are Wuhan Jinghe's Dispersing Agent FS-200 fatty acid zinc salts, KLK OLEO's Palmera B1810 stearic acid or U.S. Zinc grade 203 zinc oxide.

The vulcanisation accelerator agent is preferably selected from dithiocarbamates, guanidines, thioureas, thiazoles, sulphenamides, sulphenimides, thiurams, amines, xanthates and mixtures thereof.

Preferably, the accelerant agent is selected from N-cyclohexyl-2-benzothiazol-sulphenamide (CBS), N-tert-butyl-2-benzothiazol-sulphenamide (TBBS) and mixtures thereof.

A commercial example of a suitable accelerant agent is N-cyclohexyl-2-benzothiazol-sulphenamide Vulkacit® (CBS) marketed by Lanxess.

The vulcanisation accelerator agent may be present in the vulcanisable elastomeric composition in an overall amount generally from 0.05 phr to 10 phr, preferably from 0.1 phr to 5 phr.

The vulcanisable elastomeric composition may comprise one or more vulcanisation accelerators as defined above in mixture.

The vulcanisation retardant agent may be selected for example from urea, phthalic anhydride, N-nitrosodiphenylamine N-cyclohexylthiophthalimide (CTP), and mixtures thereof.

A commercial example of a suitable retardant agent is N-cyclohexylthiophthalimide VULKALENT G of Lanxess.

The retardant agent may be present in the vulcanisable elastomeric composition in an amount generally of from 0.05 phr to 2 phr.

The expanding agent preferably used in the vulcanisable and expandable elastomeric compound of the noise reducing element according to the present invention is selected from the group of diazo, dinitrose, hydrazide, carbazide, semicarbazide, tetrazole, carbonate, citrate compounds and mixtures thereof, as described in particular in publication WO2011/064128.

Among these, one may mention in particular dinitroso-pentane-ethylene tetramine, dinitroso-pentane-styrene tetramine, N,N'-dimethyl-N,N'-dinitroso-phthalamide, azodicarbonamide, benzene sulphonyl hydrazide, toluene sulphonyl hydrazide, p,p'-oxy bis(benzenesulphonyl)hydrazide, p-toluene sulphonyl semicarbazide, p,p'-oxy bis (benzenesulphonyl)semicarbazide, and mixtures thereof.

The foaming agent preferably used in the vulcanisable and expandable elastomeric compound of the noise reducing element according to the present invention is azodicarbonamide.

The elastomeric composition preferably comprises from 10 phr to 20 phr of said expanding agent.

The fatty acid amides useful in the present invention derive from the corresponding saturated, monounsaturated and polyunsaturated fatty acids by substitution of the —OH group of the carboxylic acid by an —$NR_1R_2$ group, where $R_1$ and $R_2$ represent, independently of each other, a hydrogen atom or a linear or branched alkyl having from 1 to 6 carbon atoms, preferably from 1 to 4 carbon atoms, preferably methyl, ethyl, propyl, isopropyl, butyl, isobutyl, and tert-butyl.

Saturated fatty acids from which the amides useful in the present invention may be obtained are, for example, butyric acid, valeric acid, capronic acid, enanthic acid, caprylic acid, pelargonic acid, capric acid, lauric acid, myristic acid, palmitic acid, margaric acid, stearic acid, arachic acid, behenic acid, lignoceric acid, cerotic acid, montanic acid, melissic acid, and laceroic acid.

Monounsaturated fatty acids from which the amides useful in the present invention may be obtained are, for example, myristoleic acid, sapienic acid, palmitoleic acid, heptadecenoic acid, oleic acid, elaidic acid, vaccenic acid, trans-vaccenic acid, asclepic acid, cis-vaccenic acid, petroselinic acid, petroselinic acid, gadoleic acid, gondoic acid, cetoleic acid, erucic acid, and nervonic acid.

Polyunsaturated fatty acids from which the amides useful in the present invention may be obtained are, for example, linoleic acid, rumenic acid, α-linolenic acid, γ-linolenic acid, stearidonic acid, arachidonic acid, timnodonic acid, clupanodonic acid, and cervonic acid.

The fatty acid amides useful in the present invention are, for example, stearamide, oleamide, erucamide, behenamide, lauramide, palmitamide, butyramide, and so on.

Commercial examples of fatty acid amides useful in the present invention are the amides marketed by Croda Italia SpA under the trade name of Crodamide™ or Incroslip™, such as for example Crodamide™ SR, Crodamide™ ER. Crodamide™ BR, Crodamide™ ORX, Crodamide™ S, Crodamide™ EBS, Crodamide™ OR, and Crodamide™ SRV, and by Fine Organics under the trade names of Finawax S, Finawax S 50, Finawax S 70.

The elastomeric composition preferably comprises from 10 phr to 30 phr, more preferably from 10 phr to 20 phr of said fatty acid amides.

The polymers and copolymers of caprolactone, lactic acid, and glycolic acid useful in the present invention are represented by polycaprolactones (PCL), polylactides (PLA or polylactic acid), polyglycolides (PGA), poly(caprolactones-co-lactides), poly(lactides-co-glycolides) (PLGA), poly(caprolactones-co-glycolides).

The polycaprolactones useful in the present invention may be obtained by annular opening polymerization from caprolactone in the presence of metallic organic compounds (e.g., tin tetraphenyl) as catalyst and dihydroxyl (such as butylene glycol) or trihydroxyl (such as trimethylolpropane) or tetrahydroxyl compounds (such as pentaerythritol) as an initiator.

Commercial examples of polycaprolactones useful in the present invention are the polycaprolactones marketed by Ingevity under the trade name of Capa™, such as Capa 2125, Capa 2045, Capa 2100J, Capa 2101, Capa 2101A, Capa 2125, Capa 2141A, Capa 2161A, Capa 2200J, Capa 2201, Capa 2201A, Capa 2202AJ, Capa 2203A, Capa 2204J, Capa 2205, Capa 2209, Capa 2241A, Capa 2302J, Capa 3022, Capa 3041, Capa 3201, Capa 6800, Capa 6250, and Capa 7201A. Further examples of polycaprolactones useful in the present invention are available under the trade name TONE, such as TONE 300 and TONE 700, marketed by Union Carbide Corporation Danbury, Connecticut.

Commercial examples of polylactides useful in the present invention are available from Chronopol Inc. (Golden, CO), from NatureWorks LLC under the trade name Eco-PLA™, from Mutsui Chemical under the trade name Lacea®, and from Biomer under the trade name L5000™

The elastomeric composition preferably comprises from 2 phr to 15 phr, more preferably from 3 phr to 10 phr of the aforesaid polymers and copolymers of caprolactone, lactic acid, and glycolic acid are present in the vulcanisable and expandable elastomeric compound in amounts preferably comprised between 2 phr and 15 phr, more preferably between 3 phr and 10 phr.

The Applicant has mainly focused on applying the invention to tyres for four-wheeled vehicles for road use, as tyres adapted to equip medium and high powered cars for transporting people (maximum chord size from 195 mm to 245 mm). The Applicant believes that the invention is also adapted for tyres for small cars or high-performance tyres (HP high performance-UHP ultra high performance) with maximum chord size, for example, of from 145 mm to 355 mm, or tyres for various vehicles such as motorcycles or heavy load vehicles for transporting people or property.

The soundproof tyre may be an HP (High Performance) or UHP (Ultra High Performance) tyre intended for equipping vehicles for the transport mainly of people, such as Sedan, Minivan, family, SUVs (Sport Utility Vehicles) and/or CUVs (Crossover Utility Vehicles), typically tyres that allow driving at high speeds.

The high and ultra-high performance tyres are in particular those which allow to reach speeds higher than at least 160 km/h, higher than 200 km/h up to over 300 km/h. Examples of such tyres are those belonging to the classes "T", "U", "H", "V", "Z", "W", "Y" according to the E.T.R.T.O. (European Tyre and Rim Technical Organisation) standards, in particular for four-wheel high-power vehicles. Typically, the tyres belonging to these classes have a section width equal to 185 mm or greater, preferably not greater than 325 mm, more preferably of between 195 mm and 325 mm. These tyres are preferably mounted on rims having seating diameters equal to or larger than 15 inches, preferably not larger than 24 inches, more preferably of between 17 inches and 22 inches. By SUV and CUV it is meant vehicles with raised distribution, typically four-wheel drive, typically having a displacement greater than or equal to 1800 cc, more preferably of between 2000 cc and 6200 cc. Preferably, these vehicles have a mass greater than 1,400 kg, more preferably of between 1500 Kg and 3000 Kg.

The tyre of the invention may be used as a summer or winter or "all-season" (tyres usable in all seasons) tyre.

The noise reducing element made of expanded elastomeric material is preferably disposed on at least a portion of the radially inner surface of the vulcanised layer of airtight elastomeric compound and extends axially at least at a part of the tread band.

Preferably, the noise reducing element is disposed on the radially inner surface of the vulcanised layer of airtight elastomeric compound, which extends by the entire circumference of the tyre and axially at least at a part of the tread band of the tyre, preferably comprised between 10% and 70% of the width of the tread band of the tyre.

Alternatively, the noise reducing element may be disposed for a width corresponding to 100% or more of the width of the tread band, i.e. it may extend over the radially inner surface of the vulcanised layer of airtight elastomeric compound corresponding to the sidewalls, in all or in part, preferably comprised between 10% and 70% of said surface.

Preferably, the noise reducing element is disposed on the radially inner surface of the vulcanised layer of airtight elastomeric compound axially extending in a substantially centred position with respect to the equatorial plane of the tyre.

In the tyre according to the present invention, the noise reducing element may be disposed on the radially inner surface of the vulcanised layer of airtight elastomeric compound as a single strip or as multiple stripes preferably parallel to each other circumferentially or with inclined pattern with respect to the equatorial plane. Such strips may substantially be rectangular portions, having a width preferably less than the cross-sectional width (maximum chord) of the tyre and length equal to or different from each other, preferably comprised between 0.5 and 0.05 of the inner circumferential development of the tyre; such substantially rectangular portions are disposed preferably in a substantially centred position with respect to the equatorial plane of the tyre.

Preferably, the number of strips of material is greater than or equal to 1, preferably between 2 and 8, preferably less than 10.

Preferably, the noise reducing element is disposed in such a way as to distribute the load as symmetrically as possible, so as not to unbalance the tyre posture.

Preferably, the noise reducing element is disposed avoiding the overlapping of the end flaps of one or more strips of material.

Preferably the coverage of the radially inner surface of the vulcanised layer of airtight elastomeric compound is less than 100% and preferably greater than 40%, more preferably greater than 50%, even more preferably greater than 60%.

Further features and advantages will appear more clearly from the detailed description of a preferred but non-exclusive embodiment of a soundproof tyre according to the present invention.

Such description is set forth hereinafter with reference to the drawing of FIG. 1 provided for indicative and, therefore, non-limiting purposes only, where "a" indicates an axial direction and "r" indicates a radial direction. For simplicity, FIG. 1 shows only a part of the tyre, the remaining part not shown being identical and disposed symmetrically with respect to the radial direction "r".

The reference numeral 100 indicates in FIG. 1 a tyre for vehicle wheels, which generally comprises a carcass structure 101 having respectively opposite end flaps engaged with respective annular anchoring structures 102, called bead cores, possibly associated with a bead filler 104. The tyre area comprising the bead core 102 and the filler 104 forms a bead structure 103 intended for anchoring the tyre onto a corresponding mounting rim, not shown. Each bead structure 103 is associated to the carcass structure by folding back of the opposite lateral edges of the at least one carcass layer 101 around the bead core 102 so as to form the so-called carcass flaps 101a as shown in FIG. 1.

The carcass structure 101 is possibly associated with a belt structure 106 comprising one or more belt layers 106a, 106b placed in radial superposition with respect to one another and with respect to the carcass structure 101, having reinforcing cords typically made of metal. Such reinforcing cords may have crossed orientation with respect to a circumferential extension direction of the tyre 100. By "circumferential" direction we mean a direction generally facing according to the direction of rotation of the tyre, or in any case not very inclined with respect to the direction of rotation of the tyre.

The belt structure 106 further comprises at least one radially outer reinforcing layer 106c with respect to the belt layers 106a, 106b. The radially outer reinforcing layer 106c comprises textile or metal cords, disposed according to a substantially zero angle with respect to the circumferential extension direction of the tyre and immersed in the elastomeric material. Preferably, the cords are disposed substantially parallel and side by side to form a plurality of turns. Such turns are substantially oriented according to the circumferential direction (typically with an angle of between 0° and 5°), such direction being usually called "zero degrees" with reference to the laying thereof with respect to the equatorial plane X-X of the tyre. By "equatorial plane" of the tyre it is meant a plane perpendicular to the axis of rotation of the tyre and which divides the tyre into two symmetrically equal parts. A tread band 109 is disposed in a radially inner position with respect to the carcass structure 101 and/or if present (as in the illustrated case) to the belt structure 106.

In a radially outer position, the tread band 109 has a rolling portion 109a intended to come into contact with the ground. Circumferential grooves, which are connected by transverse notches (not shown in FIG. 1) so as to define a plurality of blocks of various shapes and sizes distributed in the rolling portion 109a, are generally made in this portion 109a, which for simplicity is represented smooth in FIG. 1.

To optimise the performance of the tread, the tread band may be made in a two-layer structure.

Such two-layer structure comprises the rolling layer or portion 109a (called cap) and a substrate 111 (called base) forming the so-called cap-and-base structure. It is thus possible to use an elastomeric material capable of providing a low rolling resistance for the cap 109a and at the same time high resistance to wear and to the formation of cracks while the elastomeric material of the substrate 111 may be particularly aimed at a low hysteresis to cooperate in reducing rolling resistance. The under-layer 111 of vulcanised elastomeric compound may be disposed between the belt structure 106 and the rolling portion 109a.

Moreover, respective sidewalls 108 of vulcanised elastomeric compound are applied in an axially outer position to said carcass structure 101, each extending from one of the lateral edges of the tread band 109 up to the respective bead structure 103.

A strip consisting of elastomeric compound 110, commonly known as "mini-sidewall", of vulcanised elastomeric compound may optionally be provided in the connecting zone between sidewalls 108 and the tread band 109, this mini-sidewall generally being obtained by co-extrusion with the tread band 109 and allowing an improvement of the mechanical interaction between the tread band 109 and the sidewalls 108. Preferably, the end portion of sidewall 108 directly covers the lateral edge of the tread band 109.

In some specific embodiments, such as the one illustrated and described herein, the stiffness of the bead 103 may be improved by providing a reinforcing layer 120 generally known as a "flipper" in the tyre bead.

The flipper 120 is wrapped around the respective bead core 102 and the bead filler 104 so as to at least partially surround them. The flipper 120 is disposed between the carcass layer 101 and the bead structure 103. Usually, the flipper 120 is in contact with the carcass layer 101 and said bead structure 103. The flipper 120 typically comprises a plurality of metal or textile cords incorporated in a vulcanised elastomeric compound.

In some specific embodiments, such as the one illustrated and described herein, the bead structure 103 may further comprise a further protective layer 121 which is generally known by the term of "chafer", or protective strip, and which has the function to increase the rigidity and integrity of the bead structure 103.

The chafer 121 usually comprises a plurality of cords incorporated in a vulcanised elastomeric compound; such cords are generally made of textile material (for example aramid or rayon), or of metallic material (for example steel cords).

Optionally, an anti-abrasive strip 105 is disposed so as to wrap the bead structure 103 along the axially inner and outer and radially inner areas of the bead structure 103, thus interposing itself between the latter and the wheel rim when the tyre 100 is mounted on the rim.

Moreover, a radially inner surface of tyre 100 is preferably internally lined by a layer of substantially airtight elastomeric material, or so-called liner 112.

A noise reducing element of foamed elastomeric material 301 made by vulcanising the vulcanisable and expandable elastomeric composition according to the present invention is adhered by co-vulcanisation to the radially inner surface of the layer of airtight elastomeric material 112, occupying in axial extension at least a part of the crown portion of the tyre.

Preferably but non-exclusively, the tyre 100 for motor vehicles is of the HP (High Performance) or UHP (Ultra High Performance) type, i.e. it is a tyre capable of withstanding maximum speeds of at least 190 Km/h, up to over 300 Km/h. Examples of such tyres are those belonging to the classes "T", "U", "H", "V", "Z", "W", "Y".

According to an embodiment not shown, the tyre may be a tyre for motorcycle wheels. The profile of the straight section of the tyre for motorcycle (not shown) has a high transversal curvature since it must guarantee a sufficient footprint area in all the inclination conditions of the motorcycle. The transverse curvature is defined by the value of the ratio between the distance f of the ridge of the tread from the line passing through the laterally opposite ends of the tread itself, measured on the equatorial plane of the tyre, and the width C defined by the distance between the laterally opposite ends of the tread itself. A tyre with high transverse curvature indicates a tyre whose transverse curvature ratio (f/C) is at least 0.20.

The building of the tyre 100 as described above is carried out by assembling respective semi-finished products onto a forming drum, not shown, by at least one assembly device.

At least a part of the components intended to form the carcass structure 101 of the tyre 100 is built and/or assembled on the forming drum. More particularly, the forming drum lends itself to first receive the noise reducing element 301 made with the vulcanisable and expandable elastomeric compound according to the present invention, then the liner 112, and subsequently the carcass ply 101. Thereafter, devices not shown coaxially engage one of the annular anchoring structures 102 around each of the end flaps, position an outer sleeve comprising the belt structure 106 and the tread band 109 in a coaxially centred position around the cylindrical carcass sleeve and shape the carcass sleeve according to a toroidal configuration through a radial expansion of the carcass ply 101, so as to cause the application thereof against a radially inner surface of the outer sleeve.

After building of the green tyre 100, a moulding and vulcanisation treatment is generally carried out in order to determine the structural stabilisation of the tyre 100 through vulcanisation of the elastomeric compounds, as well as to impart a desired tread pattern on the tread band 109 and to impart any distinguishing graphic signs at the sidewalls 108.

The vulcanised tyre, after being extracted from the vulcanisation chamber, is kept at rest at room temperature for a variable period of time, for example between about 5 minutes and about 20 minutes in order to allow the expansion of the elastomeric material of the noise reducing element 301.

Alternatively, the vulcanised tyre 100 is built without the noise reducing element 301, which is applied, in a radially inner position to the liner layer of the finished tyre, and vulcanised, in a step subsequent to the manufacture of the finished tyre or applied to the finished tyre after being extruded, vulcanised and expanded separately.

The present invention will be further illustrated below by means of a number of preparatory examples, which are provided for indicative purposes only and without any limitation of the present invention.

EXAMPLES

Example 1

Preparation of the Expandable Elastomeric Compounds A and B

The composition of the expandable elastomeric compounds A-B is illustrated in the following Table 1. All values are expressed in phr.

TABLE 1

|  | Compound A Comparison | Compound B Invention |
|---|---|---|
| NR | 80 | 80 |
| IR | 20 | 20 |
| Carbon black | 3 | 3 |
| Silica | 16 | 16 |
| Silane | 2 | 2 |
| Expanding agent | 15 | 15 |
| Compound 1 | 12.5 | 12.5 |
| Compound 2 | — | 10 |
| Stearic acid | 2 | 2 |
| ZnO | 3.6 | 3.6 |
| Accelerant | 1.9 | 1.9 |
| Ultra-accelerant | 2 | 2 |
| vulcanising agent | 2 | 2 |

NR: natural rubber (Standard Thai Rubber STR 20 - Thaiteck Rubber);
IR: isoprene rubber (SKI 3 gr 2 - Aneka Bumi Pratama)
Carbon black: N234 from Cabot Corporation;
Silica: ZEOSIL ® 1165 MP, standard grade with surface area of approx. 175 m$^2$/g from Solvay;
Silane: bis[3-(triethoxysilyl)propyl]tetrasulphide JH-S69 from ChemSpec Ltd.;
Expanding agent: Unicell D200A azodicarbonamide from Tramaco
Compound 1: N-[3-(Dimethylamino)propyl] stearamide Crodamide ™ SR from Croda Italia SpA
Compound 2: Polycaprolactone diol terminated Capa 2125 from Ingevity
ZnO: Standard Zn oxide from A-Esse;
Accelerant: Diphenylguanidine Perkacit ® DPG from Eastman Chemical Company
Ultra-accelerant: Zinc dibenzyldithiocarbamate ZBEC from Rheinchemie
Vucanizing agent: Insoluble sulphur 67%, Solfotecnica Starting from the elastomeric compositions shown in Table 1, the corresponding elastomeric compounds were prepared according to the following process.

The mixing of the components was carried out in two steps using an internal mixer (Banbury, Intermix or Brabender).

In the first mixing step (1), all the ingredients were introduced with the exception of the vulcanising agents and accelerants. The mixing was continued for a maximum time of 5 minutes, reaching a temperature of approximately 145° C. Subsequently, in the second mixing step (2), again carried out using an internal mixer, the vulcanising agents and the accelerants were added, and the mixing was continued for about 4 minutes while maintaining the temperature below 100° C.

The compounds were then unloaded and calendared to obtain a circular sample with a diameter of about 40 mm and a thickness of about 2 mm which was subjected to MDR rheometric analysis carried out according to the ISO 6502 method, with an Alpha Technologies model MDR2000 rheometer, at 170° C. and for 10 minutes with a pressure cell and 100% filling of the vulcanisation chamber, vulcanised at 170° C. for 10 min.

Figure 2:
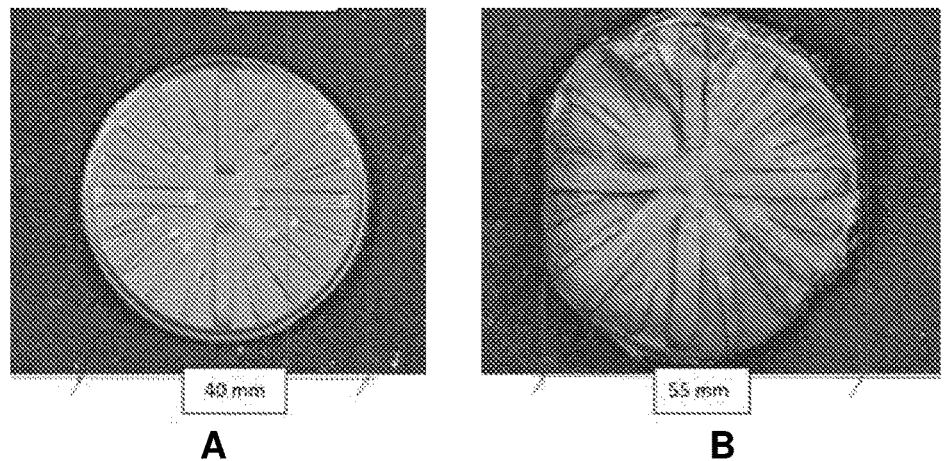
FIG. 2 shows a photograph of the samples made with compound A and B of Example 1 after vulcanisation.

FIG. 2 shows the photographs of the samples obtained with compounds A and B after vulcanisation. The sample obtained with the compound B of the invention showed a greater expansion than that of the sample obtained with the comparative compound A (about 25% by volume).

Figure 3:
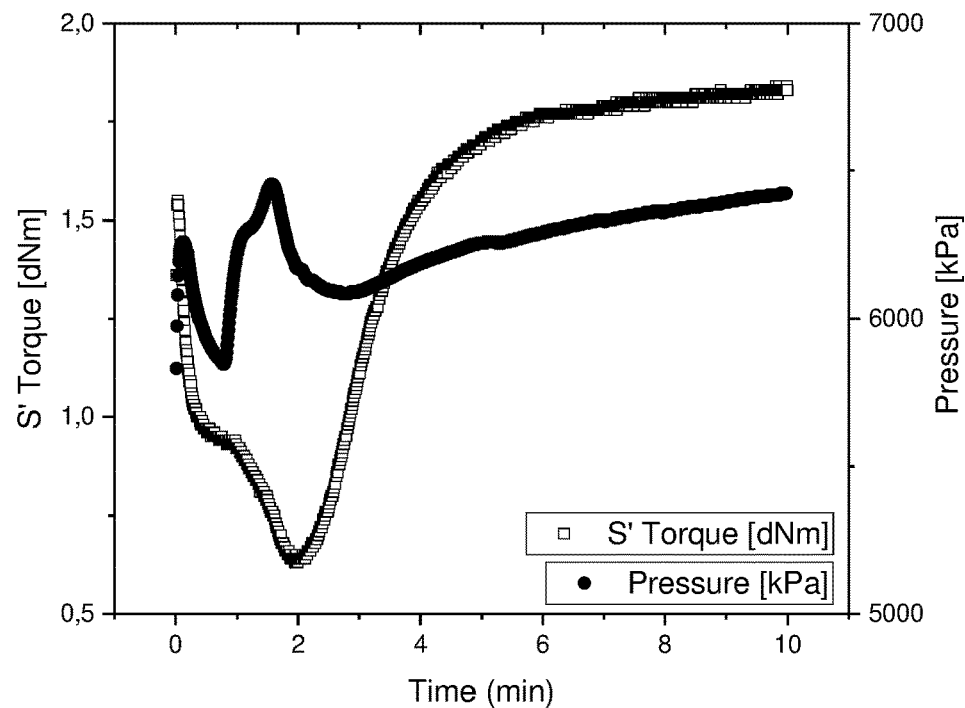
FIG. 3 shows the MDR diagram with the pressure/torque curves during the first 10 minutes of vulcanisation at 170° of the compound A as described in Example 1.

FIG. 3 shows the MDR and pressure graph obtained with compound A after 10 minutes. The pressure curve clearly showed a fluctuating trend, with a first peak at 6200 kPa and a second peak at 6400 kPa, both followed by a pressure drop, indicating that compound A can only partially retain the gas released inside it and explaining the little swelling found.

Figure 4:
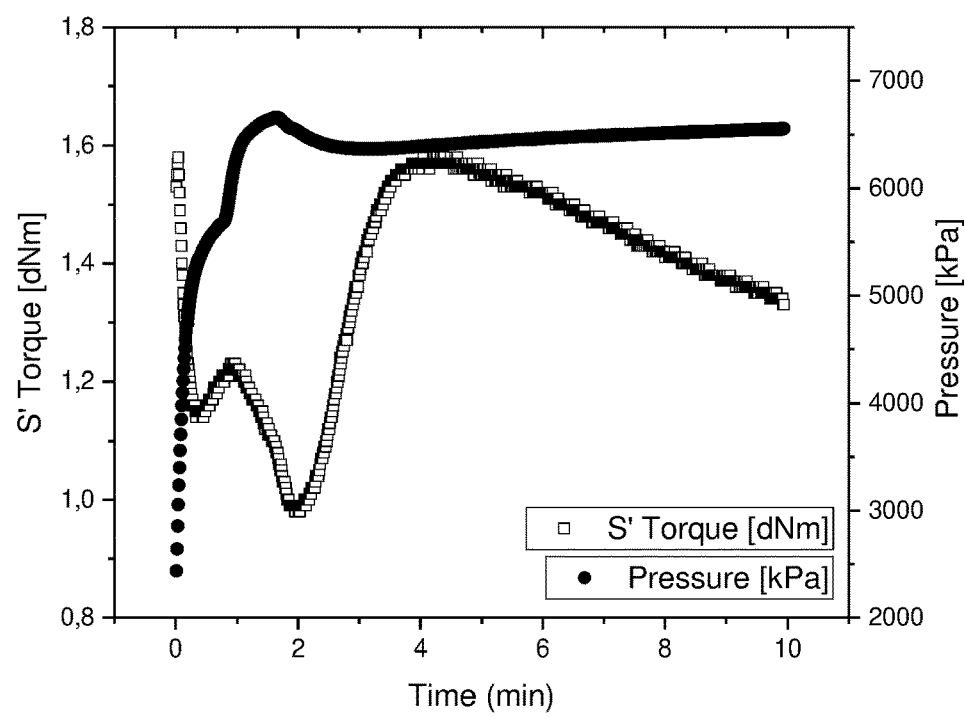
FIG. 4 shows the MDR diagram with the pressure/torque curves during the first 10 minutes of vulcanisation at 170° of the compound B as described in Example 1.

FIG. 4 shows the MDR and pressure graph obtained with compound B after 10 minutes. The pressure curve showed a rapid and substantially constant pressure increase up to a maximum of about 6500 kPa, followed by a slight decay to about 6400 kPa, demonstrating that compound B was able to effectively retain the gas released inside it and explaining the greater swelling found.

Example 2

Preparation of the Expandable Elastomeric Compounds C, D and E

The composition of the expandable elastomeric compounds C-E is illustrated in the following Table 2. All values are expressed in phr.

TABLE 2

|  | Compound C Invention | Compound D Comparison | Compound E Invention |
| --- | --- | --- | --- |
| BIIR | 100 | 100 | 100 |
| Carbon black | 15 | 15 | 15 |
| Lamellar talc | 20 | 20 | 20 |
| Expanding agent | 15 | 15 | 15 |
| Compound 1 | 12.5 | 12.5 | 12.5 |
| Compound 2 | 5 | 5 | 5 |
| Stearic acid | 2 | 2 | 2 |
| Plasticizer | 12 | 12 | 12 |
| Accelerant 1 | 1 | 1 | 1 |
| Accelerant 2 | 2.4 | 2.4 | 2.4 |
| Ultra-accelerant | 5.2 | 5.2 | 5.2 |
| vulcanising agent | 1.5 | 3 | — |

BIIR: bromoisobutyl rubber BIIR 2222 - Exxon;
Carbon black: N234 from Cabot Corporation;
Lamellar talc: Minstron HAR produced by Imerys Talc France
Expanding agent: Unicell D200A azodicarbonamide from Tramaco
Compound 1: N-[3-(Dimethylamino)propyl] stearamide Crodamide ™ SR from Croda Italia SpA
Compound 2: Polycaprolactone diol terminated Capa 2125 from Ingevity
Plasticiser: Tris(2-ethylhexyl)phosphate DISFLAMOLL TOF from Lanxess
Accelerant 1: N-cyclohexyl-2-benzothiazyl sulphonamide - Vulkacit ® CZ/EG-C from Lanxess
Accelerant 2: Diphenylguanidine Perkacit ® DPG from Eastman Chemical Company
Ultra-accelerant: Zinc dibenzyldithiocarbamate ZBEC from Rheinchemie
Vulcanizing agent: Insoluble 67% from Solfotecnica Starting from the elastomeric compositions shown in Table 2, the corresponding elastomeric compounds were prepared according to the following process.

The mixing of the components was carried out in two steps using an internal mixer (Banbury, Intermix or Brabender).

In the first mixing step (1), all the ingredients were introduced with the exception of the vulcanising agents and accelerants. The mixing was continued for a maximum time of 5 minutes, reaching a temperature of approximately 145° C. Subsequently, in the second mixing step (2), again carried out using an internal mixer, the vulcanising agents and the accelerants were added, and the mixing was continued for about 4 minutes while maintaining the temperature below 100° C.

The compounds were then unloaded and calendared to obtain a circular sample with a diameter of about 40 mm and a thickness of about 2 mm which was subjected to MDR rheometric analysis carried out according to the ISO 6502 method, with an Alpha Technologies model MDR2000 rheometer, at 170° C. and for 10 minutes with a pressure cell and 100% filling of the vulcanisation chamber, vulcanised at 170° C. for 10 min.

Figure 5:
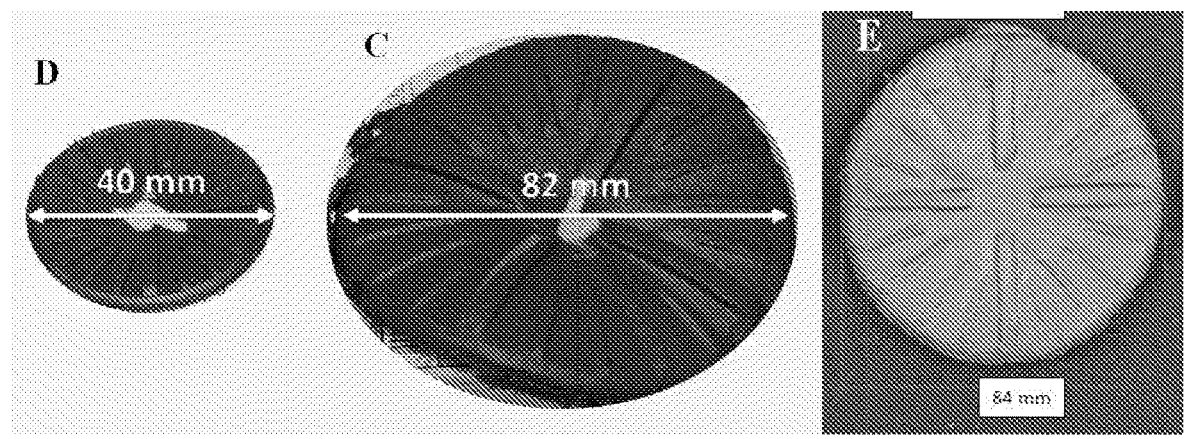
FIG. 5 shows a photograph of the samples made with compound C and D of Example 2 after vulcanisation.

FIG. 5 shows the photographs of the samples obtained with compounds C, D and E after vulcanisation. The samples obtained with the compound C and E of the invention showed an expansion greater than 100% by volume with respect to the sample obtained with the comparison compound D which did not show any expansion.

Figure 6:
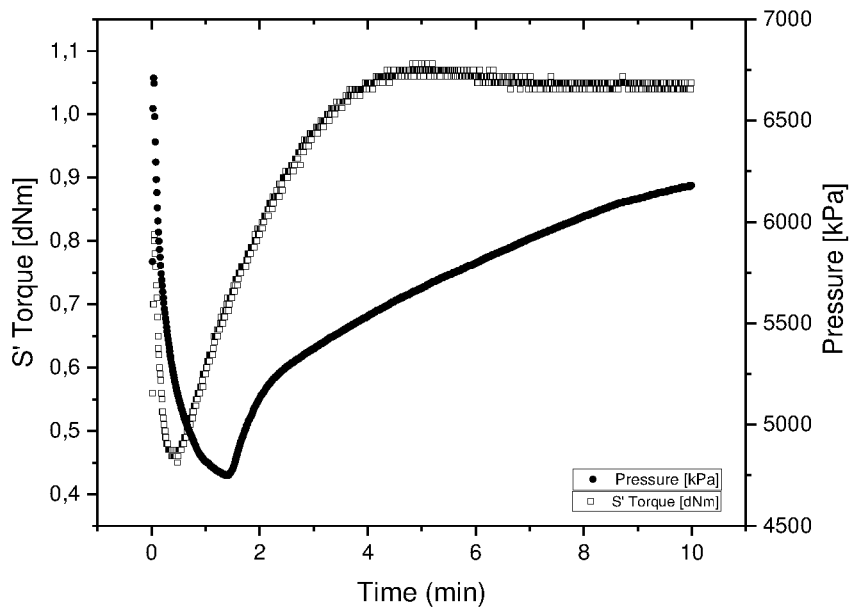
FIG. 6 shows the MDR diagram with the pressure/torque curves during the first 10 minutes of vulcanisation at 170° of the compound C as described in Example 2.

FIG. 6 shows the MDR and pressure graph obtained with compound C after 10 minutes. The vulcanisation curve was efficient with a maximum torque value of about 1.1 Nm at about 5 minutes, while the pressure curve showed an induction time of about 1 minute and 45 seconds, with a subsequent constant increase in pressure, indicating that the compound C of the invention is able to effectively retain the gas released inside it and at the same time form a sulphur lattice which is effective from the mechanical point of view, but not excessive to the point of affecting the expansion of the material.

Figure 7:
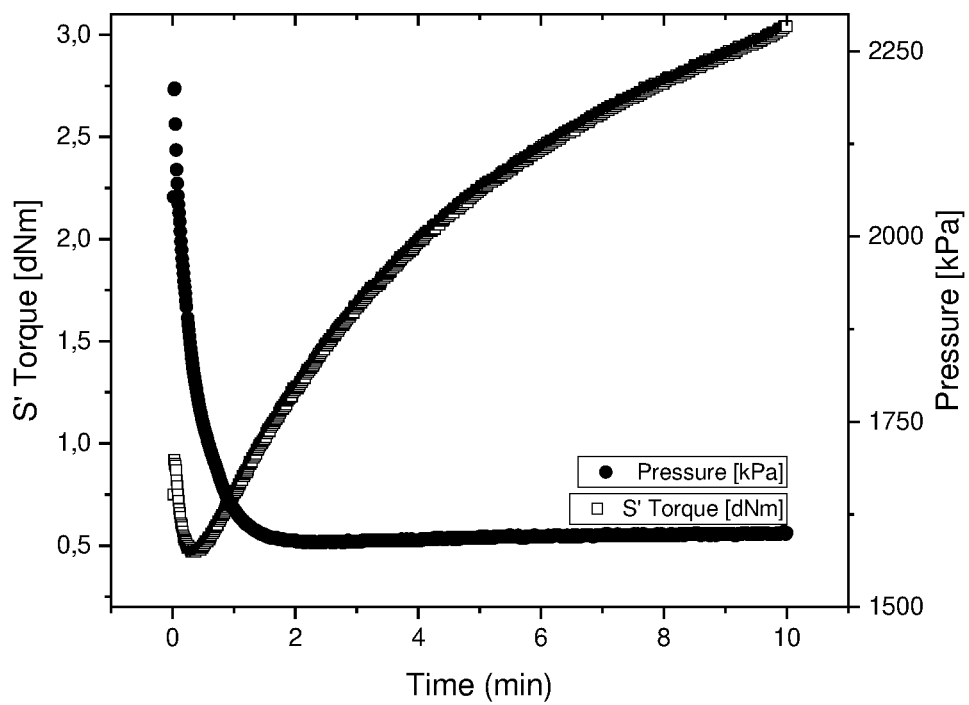
FIG. 7 shows the MDR diagram with the pressure/torque curves during the first 10 minutes of vulcanisation at 170° of the compound D as described in Example 2.

FIG. 7 shows the MDR and pressure graph obtained with the comparison compound D after 10 minutes. The vulcanisation curve showed a significantly higher torque value (3.0 Nm at 10 minutes) while the pressure curve showed a rapid and substantial flattening, demonstrating that the compound D rapidly forms a too rigid and cohesive sulphur lattice that does not allows the expansion of the material.

Figure 8:
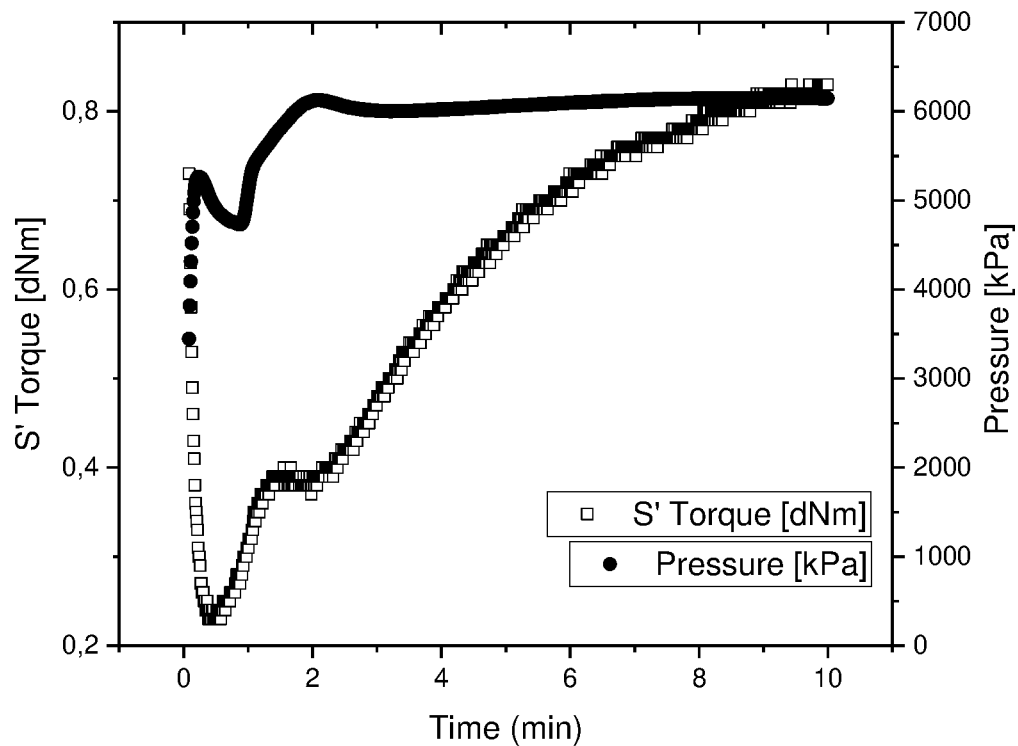
FIG. 8 shows the MDR diagram with the pressure/torque curves during the first 10 minutes of vulcanisation at 170° of the compound E as described in Example 2.

FIG. 8 shows the MDR and pressure graph obtained with compound E of the invention after 10 minutes. The vulcanisation curve showed a maximum torque value of about 0.8 Nm at about 10 minutes, lower than that of compound C due to the absence of sulphur (vulcanisation takes place in this case by the zinc present in the compound). The pressure curve showed a stable expansion with a pressure value of about 6250 kPa, demonstrating that even in the absence of sulphur the compound E of the invention is able to effectively retain the gas released inside it and at the same time form a substantially mechanically effective lattice.

Example 3

Preparation of the Expandable Elastomeric Compounds F, G, H and I

The composition of the expandable elastomeric compounds F-I is illustrated in the following Table 3. All values are expressed in phr.

TABLE 3

|  | Compound F Invention | Compound G Comparison | Invention compound H | Comparison compound I |
| --- | --- | --- | --- | --- |
| BIIR | 100 | 100 | 100 | 100 |
| Carbon black | 15 | 15 | 15 | 15 |
| Lamellar talc | 20 | 20 | 20 | 20 |

TABLE 3-continued

|  | Compound F Invention | Compound G Comparison | Invention compound H | Comparison compound I |
|---|---|---|---|---|
| Expanding agent | 15 | 15 | 15 | 15 |
| Compound 1 | 12.5 | — | 30 | — |
| Compound 2 | 5 | 5 | 5 | 5 |
| Stearic acid | 2 | 2 | 2 | 10 |
| Plasticizer | 12 | 12 | 12 | 12 |
| Accelerant 1 | 1 | 1 | 1 | 1 |
| Accelerant 2 | 2.4 | 2.4 | 2.4 | 2.4 |
| Ultra-accelerant | 5.2 | 5.2 | 5.2 | 5.2 |
| Sulphur | 1.5 | 1.5 | 1.5 | 1.5 |

BIIR: bromoisobutyl rubber BIIR 2222 - Exxon;
Carbon black: N234 from Cabot Corporation;
Lamellar talc: Minstron HAR produced by Imerys Talc France
Expanding agent: Unicell D200A azodicarbonamide from Tramaco
Compound 1: N-[3-(Dimethylamino)propyl] stearamide Crodamide ™ SR from Croda Italia SpA
Compound 2: Polycaprolactone diol terminated Capa 2125 from Ingevity
Plasticiser: Tris (2-ethylhexyl)phosphate DISFLAMOLL TOF phosphate from Lanxess
Accelerant 1: N-cyclohexyl-2-benzothiazyl sulphonamide - Vulkacit ® CZ/EG-C from Lanxess
Accelerant 2: Diphenylguanidine Perkacit ® DPG from Eastman Chemical Company
Ultra-accelerant: Zinc dibenzyldithiocarbamate ZBEC from Rheinchemie
Sulphur: unsoluble 67% from Solfotecnica Starting from the elastomeric compositions shown in Table 3, the corresponding elastomeric compounds were prepared according to the following process.

The mixing of the components was carried out in two steps using an internal mixer (Banbury, Intermix or Brabender).

In the first mixing step (1), all the ingredients were introduced with the exception of the vulcanising agents and accelerants. The mixing was continued for a maximum time of 5 minutes, reaching a temperature of approximately 145° C. Subsequently, in the second mixing step (2), again carried out using an internal mixer, the vulcanising agents and the accelerants were added, and the mixing was continued for about 4 minutes while maintaining the temperature below 100° C.

The compounds were then unloaded and calendared to obtain a circular sample with a diameter of about 40 mm and a thickness of about 2 mm which was subjected to MDR rheometric analysis carried out according to the ISO 6502 method, with an Alpha Technologies model MDR2000 rheometer, at 170° C. and for 10 minutes with a pressure cell and 100% filling of the vulcanisation chamber, vulcanised at 170° C. for 10 min.

Figure 9:
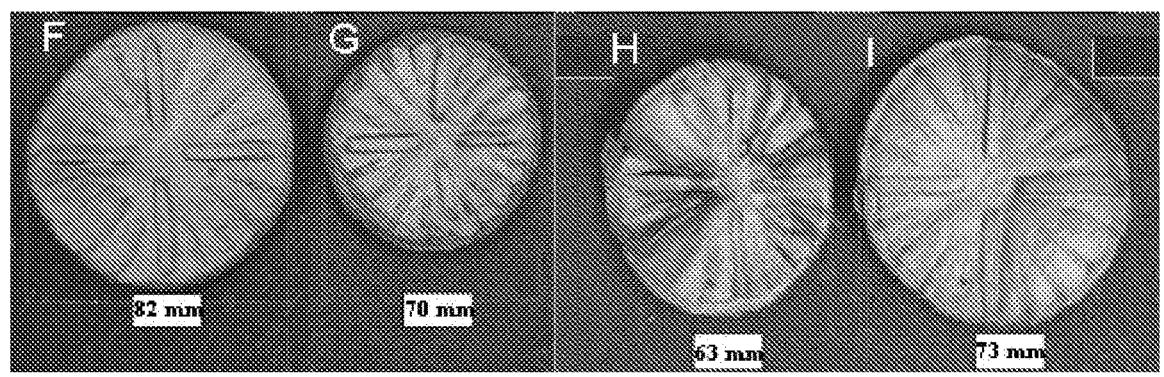
FIG. 9 shows a photograph of the samples made with compound F-I of Example 3 after vulcanisation.

FIG. 9 shows the photographs of the samples obtained with compounds F-I after vulcanisation. The sample obtained with the compound F of the invention showed the greatest expansion with a high level of homogeneity. The sample obtained with the comparative compound G, without crodamide, obtained an inhomogeneous expansion and less than about 15% with respect to the sample F. The sample obtained with the compound H of the invention, with a high content of crodamide, obtained a less homogeneous, but acceptable expansion, and about 23% less than the sample F. The sample obtained with the comparison compound I, without crodamide and with a higher stearic acid content, obtained an inhomogeneous expansion and about 11% less than the sample F.

Figure 10:
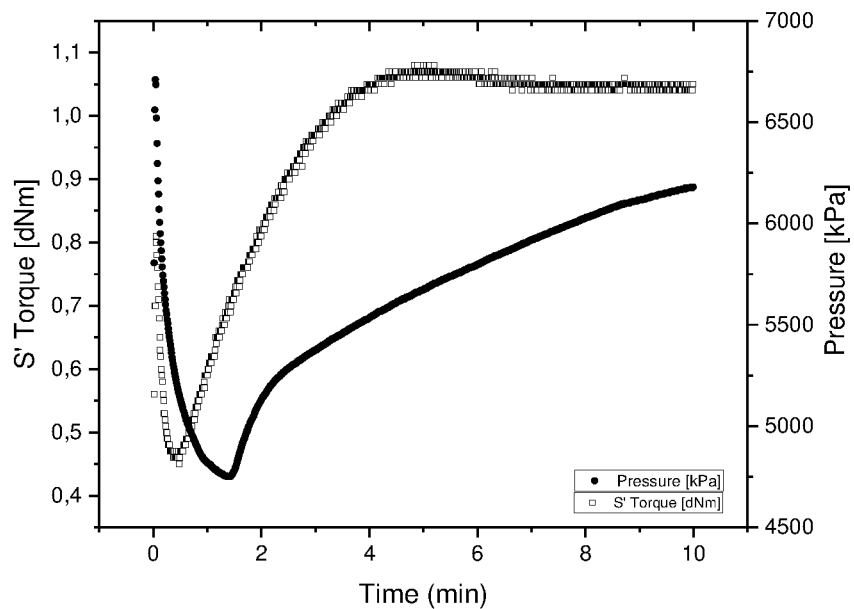
FIG. 10 shows the MDR diagram with the pressure/torque curves during the first 10 minutes of vulcanisation at 170° of the compound F as described in Example 3.

FIG. 10 shows the MDR and pressure graph obtained with compound F after 10 minutes. The vulcanisation curve was efficient with a maximum torque value of about 1.1 Nm at about 5 minutes, while the pressure curve showed an induction time of about 1 minute and 45 seconds, with a subsequent constant increase in pressure, indicating that the compound F of the invention is able to effectively retain the gas released inside it and at the same time form a sulphur lattice which is effective from the mechanical point of view, but not excessive to the point of affecting the expansion of the material.

Figure 11:
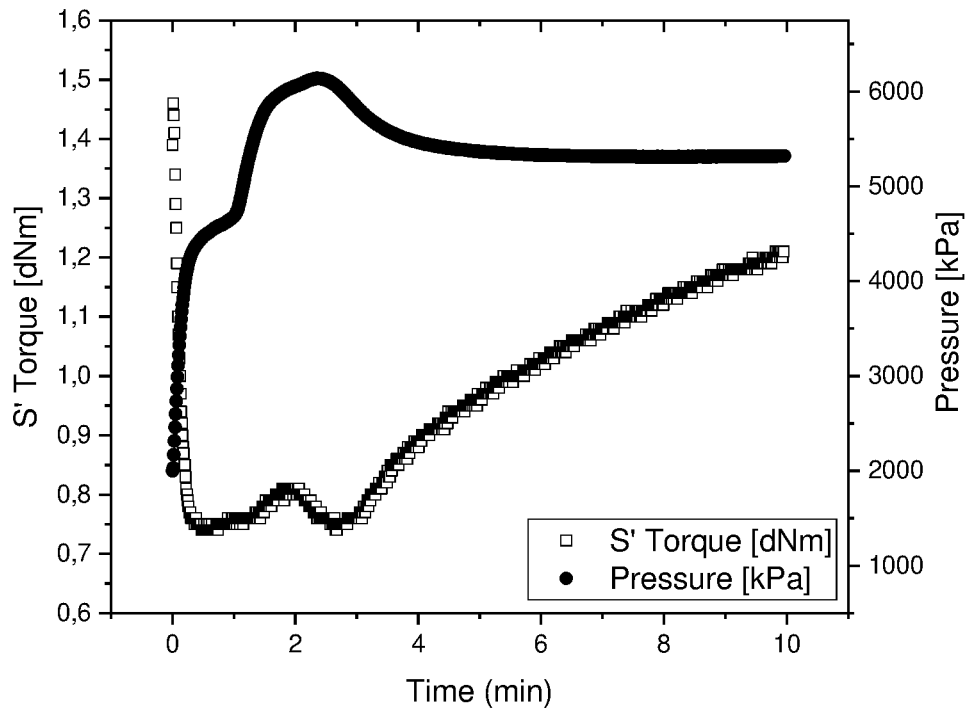
FIG. 11 shows the MDR diagram with the pressure/torque curves during the first 10 minutes of vulcanisation at 170° of the compound G as described in Example 3.

FIG. 11 shows the MDR and pressure graph obtained with the comparison compound G after 10 minutes. The pressure curve showed a rapid and substantial increase followed by a sudden pressure drop of about 600 kPa, demonstrating an unstable and inhomogeneous expansion, while the vulcanisation curve showed a maximum torque value beyond 10 minutes.

Figure 12:
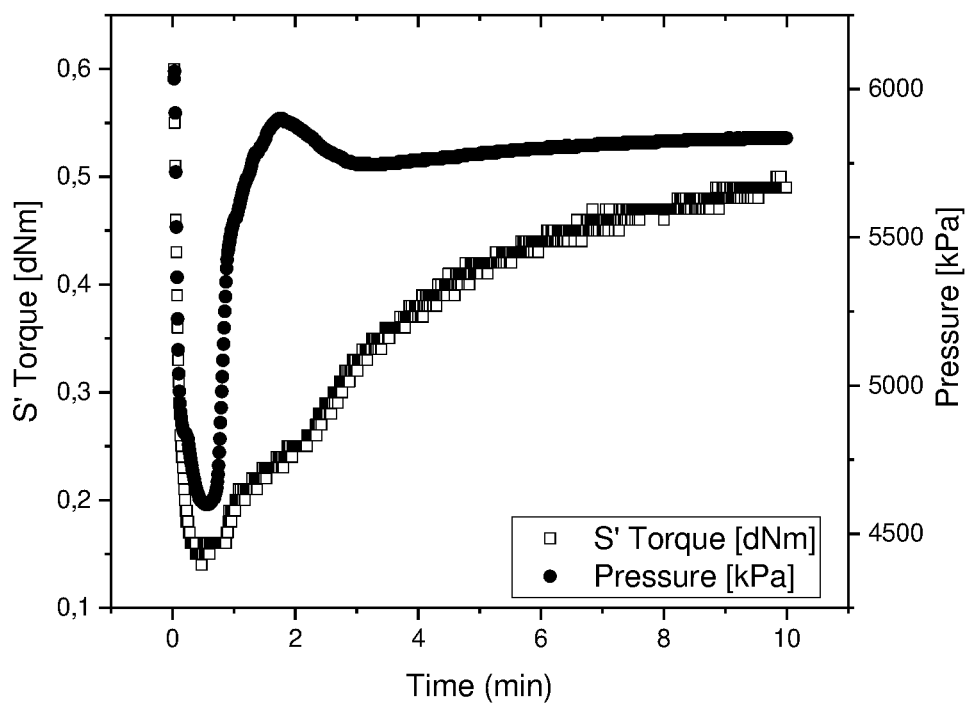
FIG. 12 shows the MDR diagram with the pressure/torque curves during the first 10 minutes of vulcanisation at 170° of the compound H as described in Example 3.

FIG. 12 shows the MDR and pressure graph obtained with compound H of the invention after 10 minutes. The pressure curve showed a peak at about 6000 kPa followed by a plateau after a slight pressure drop of about 200 kPa, demonstrating that excess crodamide causes a slight worsening of homogeneity results and less expansion. The vulcanisation curve showed a maximum torque value beyond 10 minutes.

Figure 13:
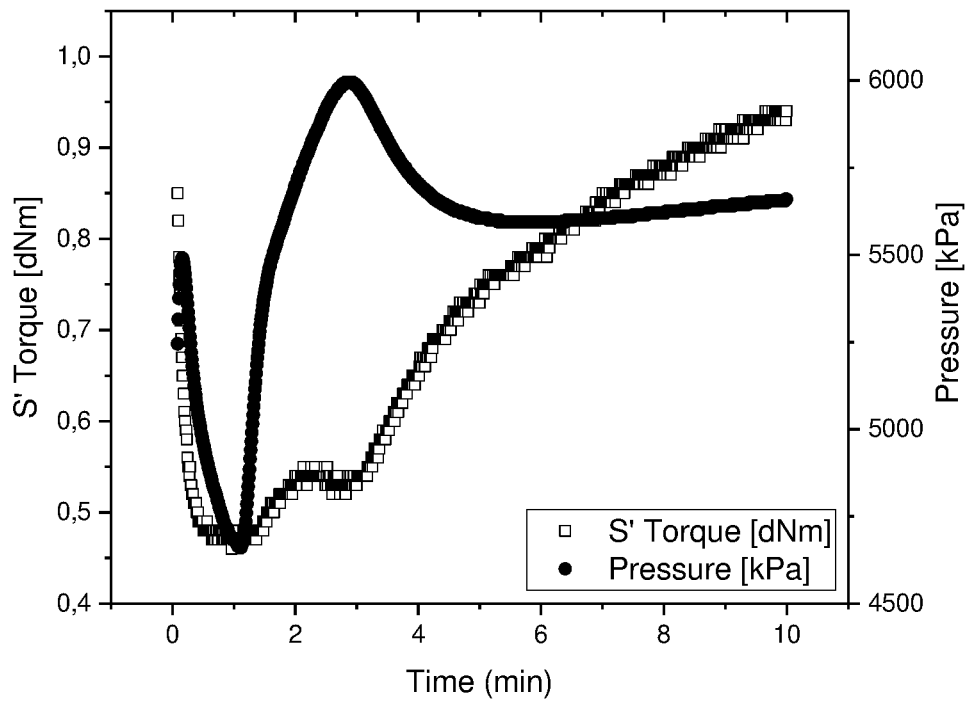
FIG. 13 shows the MDR diagram with the pressure/torque curves during the first 10 minutes of vulcanisation at 170° of the compound I as described in Example 3.

FIG. 13 shows the MDR and pressure graph obtained with the comparison compound I after 10 minutes. The pressure curve showed a sharp drop in pressure, demonstrating suboptimal expansion and presenting high inhomogeneity.

Example 4

Preparation and Characterisation of Tyres 1 and 2

The compound C described in example 2 was used in the preparation of a tyre 315/30ZR22 (107Y) XL Pirelli P ZERO™ by placing a layer of compound having a thickness of about 3 mm and a width corresponding to the crown portion of the tyre (tyre 1 of the invention) on the inner surface of the liner. The same tyre without compound layer was used as a reference (tyre 2).

The green tyre was then subjected to a conventional vulcanisation process, observing in the finished tyre an expansion of the noise reducing element made with the compound C of approximately 150 vol %.

The tyre was then subjected to the noise assessment test according to the SAE J2710 method by spinning the tyre mounted on a rim connected to an engine on a road wheel having a rough surface.

Due to the rolling of the tyre on the surface of the road wheel, vibrations are created in the tyre which are partially transmitted to the air, becoming noise measured in dB.

The test consists in bringing the wheel to the speed of 150 km/hour, leaving it free and measuring the noise up to the speed of 20 km/hour, for a total of about 10 minutes of noise acquisition.

Figure 14:
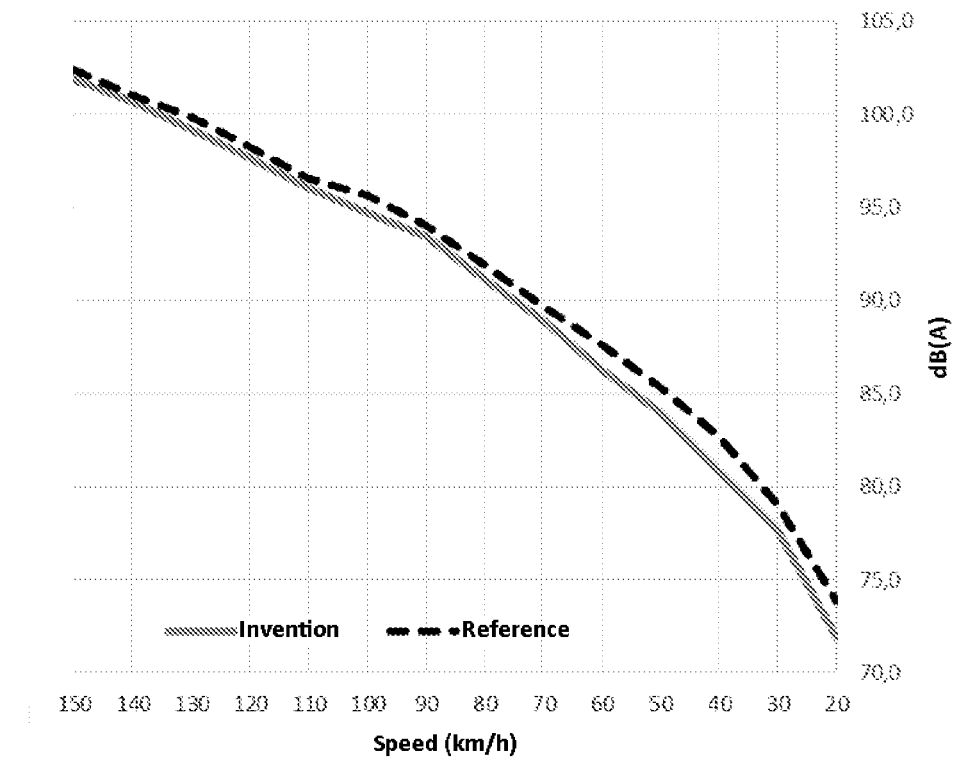
FIG. 14 shows the speed/noise graph of the tyre of the invention and of the reference tyre as described in Example 4.

FIG. 14 shows the speed/noise graph of the tyre of the invention and of the reference tyre. The result illustrated in FIG. 14 showed a significant reduction in noise at all speeds, in particular at low speeds between 60 and 30 km/hour, where the tyre of the invention showed a more than significant reduction of more than 1 dB compared to the reference tyre.

Example 5

The compound C described in Example 2 was used in the preparation of a set of 215/50R18 (96V) XL Cinturato Pirelli P7™ tyres by placing a layer of compound having a thickness of about 3 mm and a width corresponding to the crown portion of the tyre (tyre 1 of the invention) on the inner surface of the liner. The same set of tyres without a compound layer was used as a reference (tyre 2).

The sets of green tyres were then subjected to a conventional vulcanisation process, observing in the finished tyre of the invention an expansion of the noise reducing element made with the compound C of about 150 vol %.

The tyre sets were fitted to a BMW i3 vehicle and subjected to the noise assessment test according to the "pass-by-noise" method described in ISO 362-1:2015 (UN R51). In short, the test consists in driving the vehicle along a straight road equipped with microphones disposed along the sides of the road, with a constant acceleration (2.0 m/s$^2$) starting from a predetermined initial speed (50 km/h).

Figure 15:
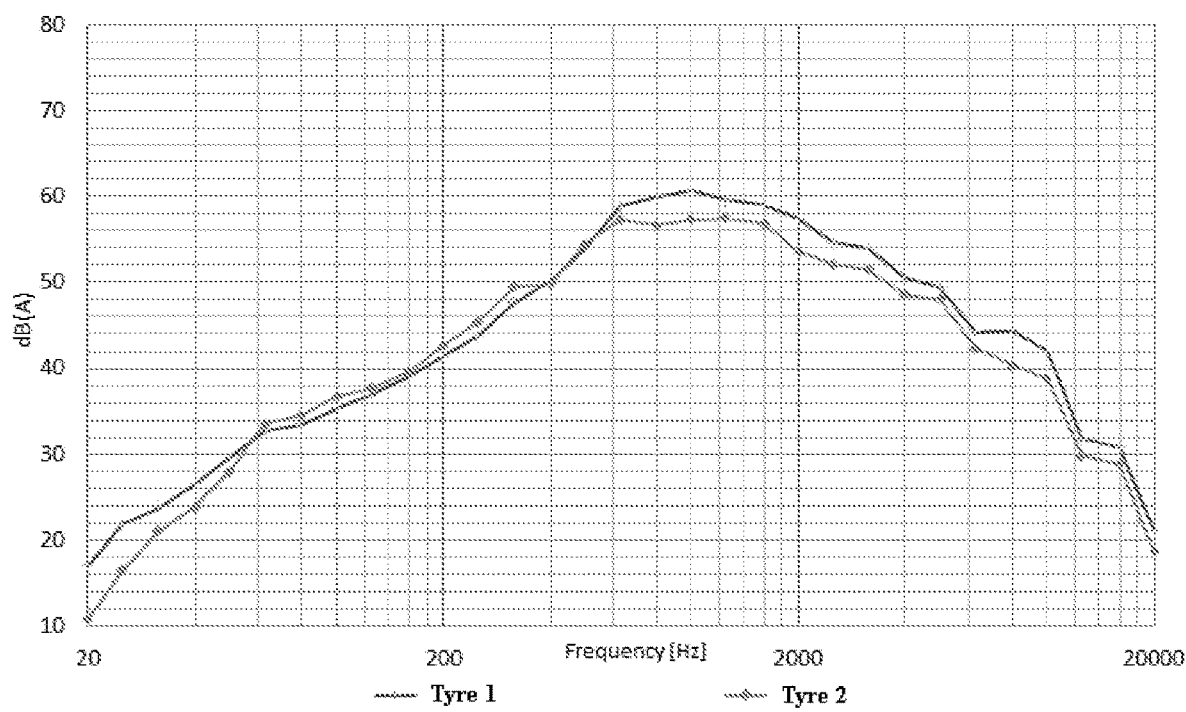
FIG. 15 shows the frequency/noise graph of the tyre of the invention and of the reference tyre as described in Example 5.

FIG. 15 shows the noise/frequency graph of the tyre of the invention and of the reference tyre. The result illustrated in FIG. 15 showed a significant reduction of the noise peak, in particular in the frequency range between 600 and 2000 Hz, where the tyre 1 of the invention showed a more than significant reduction of about 2 dB compared to the reference tyre 2.

The invention claimed is:
1. A soundproof tyre for vehicle wheel comprising:
a carcass structure;
a tread band in a radially outer position with respect to the carcass structure;
a vulcanised layer of airtight elastomeric compound (liner), disposed in a radially inner position with respect to the carcass structure; and
a noise reducing element made of foamed elastomeric material disposed in a radially inner position with respect to the vulcanised layer of airtight elastomeric compound and axially extending at least at a part of the tread band;
wherein the foamed elastomeric material comprises, before vulcanization, a vulcanisable and foamable elastomeric compound comprising, before mixing, an elastomeric composition comprising:
(i) 100 phr of at least one natural or synthetic elastomeric polymer,
(ii) from 10 phr to 80 phr of at least one reinforcing filler,
(iii) less than 3 phr of at least one vulcanising agent,
(iv) from 5 phr to 30 phr of at least one expanding agent,
(v) from 5 phr to 40 phr of at least one compound chosen from fatty acid amides, and
(vi) from phr 1 to 20 phr of at least one compound chosen from polymers and copolymers of caprolactone, lactic acid, glycolic acid, and mixtures thereof.

2. The soundproof tyre according to claim 1, wherein the at least one expanding agent is chosen from diazo compounds, dinitroso compounds, hydrazide compounds, carbazide compounds, semi-carbazide compounds, tetrazole compounds, carbonate compounds, citrate compounds, and mixtures thereof.

3. The soundproof tyre according to claim 1, wherein the at least one expanding agent is chosen from dinitroso-pentane-ethylene tetramine, dinitroso-pentane-styrene tetramine, N,N'-dimethyl-N, N'-dinitroso-phthalamide, azodicarbonamide, benzene sulphonyl hydrazide, toluene sulphonyl hydrazide, p,p'-oxy bis(benzenesulphonyl) hydrazide, p-toluene sulphonyl semicarbazide, p,p'-oxy bis (benzenesulphonyl) semicarbazide, and mixtures thereof.

4. The soundproof tyre according to claim 1, wherein the at least one expanding agent is azodicarbonamide.

5. The soundproof tyre according to claim 1, wherein the elastomeric composition comprises from 10 phr to 20 phr of the at least one expanding agent.

6. The soundproof tyre according to claim 1, wherein the polymers and copolymers of caprolactone, lactic acid, and glycolic acid are chosen from polycaprolactones (PCL), polylactides (PLA or polylactic acid), polyglycolides (PGA), poly (caprolactones-co-lactides), poly (lactides-co-glycolides) (PLGA), poly (caprolactones-co-glycolides), and mixtures thereof.

7. The soundproof tyre according to claim 1, wherein the elastomeric composition comprises from 10 phr to 30 phr of the fatty acid amides.

8. The soundproof tyre according to claim 7, wherein the elastomeric composition comprises from 10 phr to 20 phr, of the fatty acid amides.

9. The soundproof tyre according to claim 1, wherein the elastomeric composition comprises from 2 phr to 15 phr, of the polymers and copolymers of caprolactone, lactic acid, and glycolic acid.

10. The soundproof tyre according to claim 9, wherein the elastomeric composition comprises from 3 phr to 10 phr, of the polymers and copolymers of caprolactone, lactic acid, and glycolic acid.

11. The soundproof tyre according to claim 1, wherein the vulcanisable and foamable elastomeric compound comprises (i) at least one natural or synthetic diene elastomeric polymer derived from the polymerisation of one or more monomers, at least one of which is a conjugated diene, or (ii) at least one elastomeric polymer of one or more monoolefins with an olefinic comonomer or derivatives thereof.

12. The soundproof tyre according to claim 11, wherein the (i) diene elastomeric polymer is chosen from natural or synthetic cis-1,4-polyisoprene, 3,4-polyisoprene, polybutadiene, isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

13. The soundproof tyre according to claim 11, wherein the (ii) elastomeric polymer is chosen from ethylene/propylene copolymers (EPR) or ethylene/propylene/diene copolymers (EPDM); polyisobutene; butyl rubbers; halobutyl rubbers; or mixtures thereof.

14. The soundproof tyre according to claim 1, wherein the fatty acid amides are derived from corresponding fatty acids chosen from (i) saturated fatty acids, (ii) monounsaturated fatty acids, and (iii) polyunsaturated fatty acids,
by substitution of the —OH group of the carboxylic acid by an —NR$_1$R$_2$ group, where R$_1$ and R$_2$ represent, independently of each other, a hydrogen atom or a linear or branched alkyl having from 1 to 6 carbon atoms.

15. The soundproof tyre according to claim 14, wherein the saturated fatty acids are chosen from butyric acid, valeric acid, capronic acid, enanthic acid, caprylic acid, pelargonic acid, capric acid, lauric acid, myristic acid, palmitic acid, margaric acid, stearic acid, arachic acid, behenic acid, lignoceric acid, cerotic acid, montanic acid, melissic acid, and laceroic acid, and mixtures thereof.

16. The soundproof tyre according to claim 14, wherein the monounsaturated fatty acids are chosen from myristoleic acid, sapienic acid, palmitoleic acid, heptadecenoic acid, oleic acid, elaidic acid, vaccenic acid, trans-vaccenic acid, asclepic acid, cis-vaccenic acid, petroselinic acid, petroselaidic acid, gadoleic acid, gondoic acid, cetoleic acid, erucic acid, nervonic acid, and mixtures thereof.

17. The soundproof tyre according to claim 14, wherein the polyunsaturated fatty acids are chosen from linoleic acid, rumenic acid, α-linolenic acid, γ-linolenic acid, stearidonic acid, arachidonic acid, thymnodonic acid, clupanodonic acid, and cervonic acid.

18. A vulcanisable and foamable elastomeric compound comprising, before mixing, an elastomeric composition comprising:
    (i) 100 phr of at least one natural or synthetic elastomeric polymer,
    (ii) from 10 phr to 80 phr of at least one reinforcing filler,
    (iii) less than 3 phr of at least one vulcanising agent,
    (iv) from 5 phr to 30 phr of at least one expanding agent, and
    (v) from 5 phr to 40 phr of at least one compound chosen from fatty acid amides, and
    (vi) from 1 phr to 20 phr of at least one compound chosen from polymers and copolymers of caprolactone, lactic acid, glycolic acid, and mixtures thereof.

* * * * *